Aug. 18, 1936.  M. M. CLAYTON  2,051,129
OUTLET BOX
Filed July 20, 1935
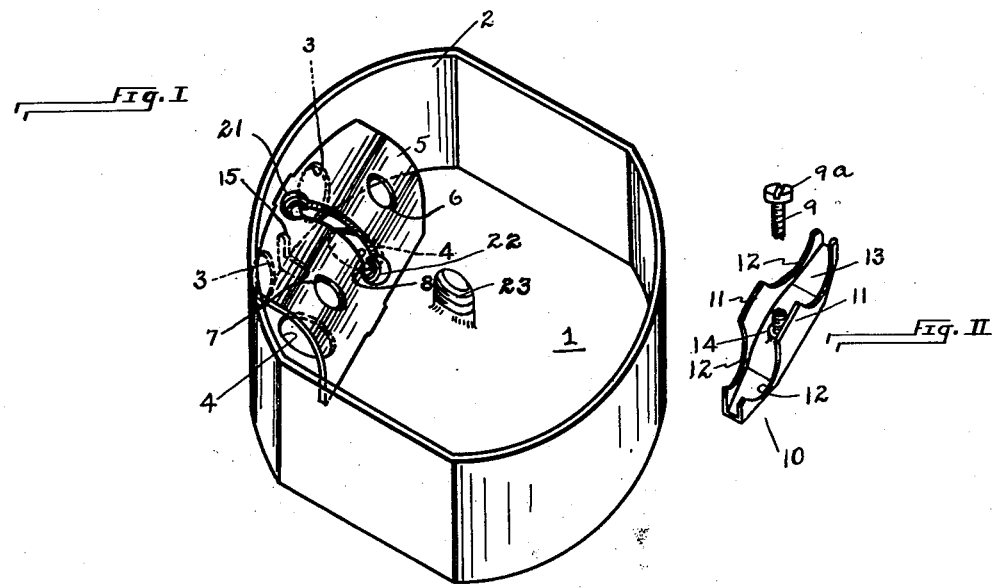
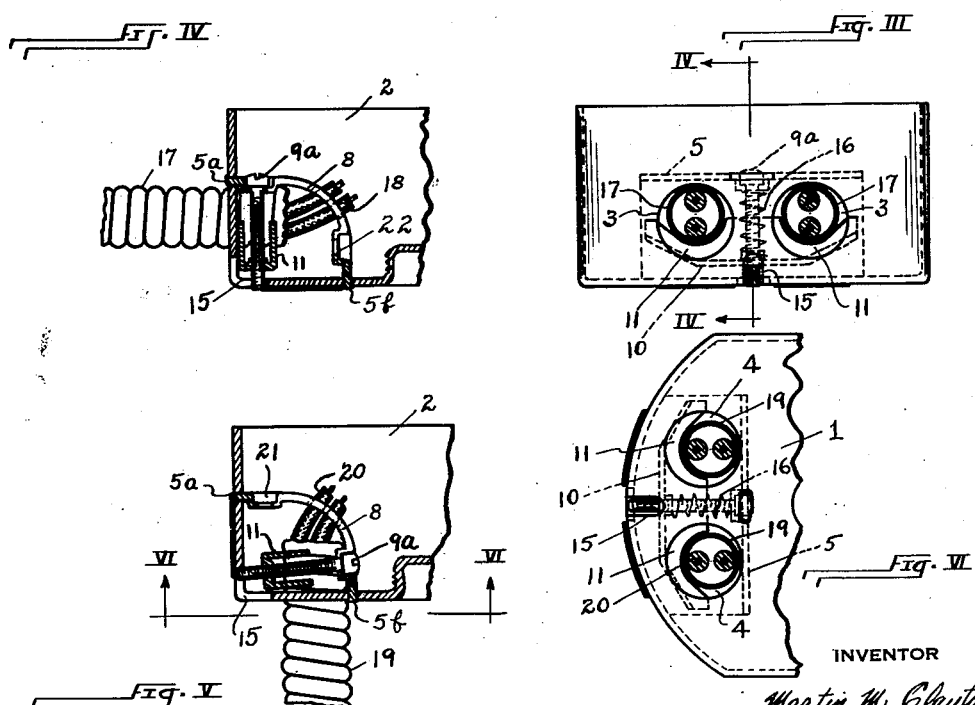
INVENTOR
Martin M. Clayton
by Christy and Wharton
his attorneys Patented Aug. 18, 1936

2,051,129

UNITED STATES PATENT OFFICE 2,051,129

OUTLET BOX

Martin M. Clayton, Baden, Pa., assignor to National Electric Products Corporation, a corporation of Delaware Application July 20, 1935, Serial No. 32,427

2 Claims. (Cl. 247—25)

This invention relates to an outlet box for the connection of electrical conductors, such as armored cables, and other flexible cables.

Outlet boxes provided with knock-outs, which may be removed for the entry of electrical cables into the boxes, frequently have the knock-outs arranged in pairs in two walls of the box set at an angle to each other, and are provided with a clamping element to engage either a single cable or two cables brought in through the knock-out openings in the outlet box walls. Various arrangements of clamping elements, and mounting and operating means therefor, have been proposed and utilized. There remain, however, problems to be solved in connection with the clamping of cables at their entry into an outlet box in this general manner.

If the clamping element be mounted on an advancing screw, which extends diagonally to the axis of a cable as it lies in a knock-out opening through the wall of an outlet box, there is a tendency for the action of the clamp and screw to flex the cable against the outlet box wall, and also to drive the cable backwardly through the opening. When two cables of different diameter are connected, the clamp cannot bear with equal pressure against each; and, additionally, in such structure the clamp-tightening screw projects outwardly beyond the outlet box, thus interfering with the installation of the box against ceilings, joists, or other solid parts of buildings.

Other problems presented by the clamping of cables adjacent the point of entry into an outlet box consist in so arranging the clamping element of the assembly that it blanks the region of a knock-out opening through which the cable is inserted, and the problem of so arranging the clamping element and its operating screw means that a cable is gripped well away from its stripped terminal.

An object of my invention is to provide in an outlet box of the type described, cable clamping means which solves the above-named problem; firmly gripping a cable adequately away from its stripped terminal with a force exerted substantially at right angles to the axis of the cable, whether the cable be entered from either the side or bottom knock-outs of an outlet box, blanking any excess space in a knock-out opening through which a cable is entered by means of the clamping element, and having the clamping element and the operating means for it so arranged that no element of the assembly projects a substantial distance beyond the outer surface of the outlet box wall.

In the accompanying drawing Fig. I is an isometric view of an outlet box of the type indicated, showing therein the housing positioned adjacent knock-out openings in the outlet box for mounting a cable-clamping element and its operating means.

Fig. II is a detail, isometric view, showing the clamping element and its operating screw for mounting in the housing of the outlet box shown in Fig. I, the operating screw for the clamp being shown as intermediately broken away.

Fig. III is an elevational view, looking toward the outer surface of that outlet box side wall against which the housing of the clamping assembly is mounted, showing cables introduced through the knock-out openings in this wall, and showing in dotted lines the clamping assembly of the outlet box.

Fig. IV is a vertical, sectional view, taken on the median plane IV—IV of Fig. III, and is a fragmentary view showing only that region of the outlet box provided with knock-out openings, and with the cable-clamping assembly.

Fig. V is a vertical, sectional view, similar to Fig. IV, but illustrating the introduction of cables through the knock-out openings in the bottom wall of the outlet box.

Fig. VI is a bottom plan view, further illustrating the condition of cable-attachment, and the position of the cable-clamping parts, shown in Fig. V.

Referring to the accompanying drawing, in Fig. I, which shows the outlet box in perspective, reference numeral 1 designates the floor of the box, and reference numeral 2 designates that side wall of the box in which knock-out openings 3 are formed. The floor 1 of the box has therein knock-out openings 4, which are in line with the knock-out openings 3 in the side wall. Attached to both side wall 2 and floor 1 is a housing 5, which bridges a space otherwise defined by the side wall 2 and the floor 1. Housing 5 is firmly fixed to the outlet box in suitable manner. As shown, the housing is firmly attached to the outlet box by tongues 5a and 5b passed through slots in the side wall 2 and floor 1 of the outlet box, respectively, and riveted, or otherwise clinched beyond the outer surfaces of these outlet box elements.

The wall of housing 5 is curved and has therein a pair of openings 6 and 7 for the projection of the cable conductors. As shown, but one pair of openings, intermediately positioned with respect to the wall and floor knock-outs 3 and 4, is provided. If desired, however, two pairs of openings may be made through the housing, with each such pair of openings approximately aligned with a pair of the knock-outs.

As shown, only the one side wall 2 is provided with knock-out openings, and the floor 1 is provided with knock-out openings only in its adjacent region. It is to be understood, however, that, in accordance with the dimensions of the outlet box, and the association in which it is to be used, another region, or other regions, of the outlet box may similarly be provided with knock-out openings, and similarly equipped with a housing for the mounting of clamping elements.

Intermediate the openings 6 and 7 therein, the wall of housing 5 is provided with a transversely extending slot 8, through which may be extended the threaded shank of clamp-operating screw 9. In assembly the cable-clamping element, designated generally by reference numeral 10, lies within the space defined by the side wall 2, the floor 1 of the outlet box, and by the housing 5.

The cable-clamping element is shown in detail in Fig. II of the drawing as of channel section, having its side flanges 11 provided with aligned cable-engaging notches 12, and having its web 13 provided with a centrally disposed threaded opening 14 to receive the threaded shank of operating screw 9. With cable-clamp 10 enclosed by the housing 5, the shank of operating screw 9 is inserted through transverse slot 8 in the housing wall, and is brought into threaded engagement with the cable-clamping element. The head 9a of the operating screw being of a diameter greater than the width of the slot 8, the screw is enabled to traverse the slot without passing completely therethrough.

Referring particularly to Figs. IV and V of the drawing, it will be seen that the shank of operating screw 9 passes wholly through the web 13 of the clamping element, and has its projecting terminal lying in a relatively short slot 15, formed in both the side wall 2 and the bottom 1 of the outlet box at their junction line. In assembly of the parts, the clamp-operating screw may, therefore, be moved into different angular positions, using the projection of its shank into the slot 15 as a flexible center about which it may turn. The greater length of the slot 8 in the housing provides for a greater linear movement of the head of the screw, permitting movement of the screw into two extreme positions substantially at right angles to each other.

In order to maintain the clamping element in position to engage a cable introduced through one of the knock-out openings, I provide yielding spacing means interposed between the web 13 of the cable-clamping element and the inner surface of the housing wall. Such yielding spacing means are shown as a relatively light coil spring 16, but may, if desired, be of some such alternative structure as a rubber tube, or a collapsible paper tube.

Referring to Figs. III and IV of the drawing, illustrating the attachment of cables to the outlet box, a pair of armored cables 17, containing conductors 18, are shown as introduced through knock-out openings 3 in the side wall of the outlet box, with their conductors 18 extended through the openings 6 and 7 in the wall of housing 5. In this position, operating screw 9 stands substantially perpendicular to the plane of outlet box floor 1, with the projecting terminal of its shank lying against the floor of the outlet box at the end of slot 15, and with its region adjacent screw head 9a lying against the outer terminal of housing slot 8.

As so introduced, the cables 17 lie in the recesses 12 provided in the walls 11 of the clamping element, and are engaged between the clamping element and the opposite walls of the knock-out openings 3 in which they lie. This engagement is effected by running screw 9 down, thus compressing coil spring 16, or its equivalent yielding spacing element, and causing the clamp firmly to bear against the cables.

It will be noted in Fig. IV of the drawing that the wall 11 of the clamping element, lying toward side wall 2 of the outlet box, is in a position parallel to the outlet box wall, and perpendicular to the floor 1 of the outlet box. This wall 11 of the clamping element serves, therefore, to blank off that region of each of the openings 3 which is not occupied by the cable lying in it.

As shown, the cables 17 are of equal diameter. It will be noted, however, that both slot 8 in the housing 5, and slot 15 in the outlet box itself, are in width substantially greater than the shank diameter of the screw 9. This permits a slight rocking movement of the operating screw in a plane transverse to the axis of the cable. Such rocking movement of the operating screw 9, and of the cable-clamping element 10, provides, within reasonable limits, accommodation to differences in diameter of two cables engaged by the clamping element.

Figs. V and VI of the drawing illustrate the clamping of a pair of cables 19, introduced through knock-out openings 4 in the floor 1 of the outlet box, and having their conductors 20 extended through openings 6 and 7 through the wall of housing 5. In this position, clamp-operating screw 9 lies with its projecting terminal in contact with side wall 2 at an end of slot 15, and with the region adjacent its head 9a lying against the lower and inner terminal of slot 8 in the wall of housing 5. It will be observed that, in this position of the parts, operating screw 9 approximates a position of parallelism to the floor 1 of the outlet box. Similarly, that one of the walls 11 of the clamping element which lies toward the floor of the outlet box is also approximately parallel to the plane of the outlet box floor, and, therefore, similarly blanks off excess space in the knock-out openings 4 which is not occupied by the cables 19. Clamping engagement is, in this instance, effected identically with clamping engagement of cables 17, shown as introduced through the knock-out openings 3.

It will be seen that, in each instance, the clamping force exerted on a cable by the clamping element 10, and the reactive force supplied by the opposed edge of the opening in which the cable lies, are directed approximately at right angles to the axis of the cable, thus firmly engaging the cable, without any tendency to push it outwardly from the position in which it lies, and without any tendency for the cable terminal to slip away from engagement. In both instances the zone of engagement is immediately adjacent the inner surface of the outlet box wall, so that an adequate terminal region of the cable lies inwardly of the outlet box, and within the housing 5. As has been noted above, the knock-out openings in which the cables lie are blanked off around the cables by the clamping element.

Desirably, as shown, countersunk seats 21 and 22 are formed at both terminals of slot 8 to receive the head 9a of the screw 9. These seats are of assistance in defining for the user the extreme positions of the cable-clamping screw in which it has an approximate right angular relation with the cables entered through either the knock-outs 3 or the knock-outs 4. They also serve positively to position the clamp-operating screw 9 in its alternative operative positions. If, as shown, the outlet box floor 1 has an upwardly projecting stud 23 formed therein, the lower seat 22, by providing a recess for receiving screw head 9a, gives clearance for the mounting of couplings or other fittings on the stud.

In no clamping position of the assembly does that terminal region of the screw 9, which projects outwardly beyond clamping element 10, project a substantial distance beyond the outer surface of the outlet box.

It should be explained that my cable-connecting outlet box assembly provides latitude both in the size and in the shape of the cables clamped therein. Because of the right angular relation assumed by the clamp-operating screw 9 in both clamping positions, and the rocking adjustment which is provided, it is capable of engaging firmly in the knock-outs, cables, or looms, of oval or elliptical contour, and is also capable of firmly engaging a cable, or loom, of the relatively small cross-sectional area usual for housing a single conductor rather than two paired conductors.

I claim as my invention:

1. The herein described combination of an outlet box having a pair of openings for the reception of cables in a side wall thereof and an adjacent pair of openings in the floor of the outlet box with a housing fixed to extend between the side wall of the outlet box and the outlet box floor in the region of said openings, a transverse slot in said housing, a cable-clamping element lying within said housing, an advancing screw having its shank extended transversely through the slot of said housing and threaded through said cable-clamping element, and means provided in the outlet box to accommodate the terminal of the screw projected beyond the cable-clamping element for limited movement in a path aligned with the housing slot.

2. The herein described combination of an outlet box having a pair of openings for the reception of cables in a side wall thereof and an adjacent pair of openings in the floor of the outlet box with a housing fixed to extend between the side wall of the outlet box and the outlet box floor in the region of said openings, a transverse slot in said housing, a cable-clamping element lying within said housing, an advancing screw having its shaft extended transversely through the slot of said housing and threaded through said cable-clamping element, and a slot in the outlet box wall and outlet box floor intersecting the junction line between the said wall and floor for receiving the terminal of the advancing screw extended beyond the cable-clamping element and providing a path for the extended terminal of the screw shank accommodating for swinging movement of the operating screw in traversing the housing slot.

MARTIN M. CLAYTON.